(12) United States Patent
Miyazoe et al.

(10) Patent No.: US 6,520,202 B2
(45) Date of Patent: Feb. 18, 2003

(54) MANIFOLD VALVE HAVING POSITION DETECTING FUNCTION

(75) Inventors: Shinji Miyazoe, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/927,325

(22) Filed: Aug. 13, 2001

(65) Prior Publication Data

US 2002/0026959 A1 Mar. 7, 2002

(30) Foreign Application Priority Data

Sep. 5, 2000 (JP) ........................................ 2000-268918

(51) Int. Cl.$^7$ ........................ F16K 37/00; F15B 13/043
(52) U.S. Cl. ............. 137/554; 137/625.64; 137/625.65; 137/884
(58) Field of Search ........................... 137/554, 625.64, 137/884, 625.65; 251/367

(56) References Cited

U.S. PATENT DOCUMENTS

| | | | | |
|---|---|---|---|---|
| 4,928,730 A | * | 5/1990 | Ando et al. .................. | 137/554 |
| 6,164,323 A | * | 12/2000 | Smith et al. ................. | 137/554 |
| 6,220,284 B1 | * | 4/2001 | Hayashi et al. .............. | 137/554 |
| 6,267,140 B1 | * | 7/2001 | Hayashi et al. .............. | 137/554 |
| 6,283,149 B1 | * | 9/2001 | Hayashi et al. .............. | 137/554 |
| 6,386,229 B1 | * | 5/2002 | Morikawa et al. ........... | 137/552 |
| 6,427,720 B1 | * | 8/2002 | Hayashi et al. .............. | 137/554 |

FOREIGN PATENT DOCUMENTS

| | | |
|---|---|---|
| JP | 2-66784 | 5/1990 |
| JP | 2-66785 | 5/1990 |
| JP | 2-88079 | 7/1990 |

* cited by examiner

Primary Examiner—A. Michael Chambers
(74) Attorney, Agent, or Firm—Oblon, Spivak, McClelland, Maier & Neustadt, P.C.

(57) ABSTRACT

A manifold valve in which mounting of a magnetometric sensor is easy and wiring is easy and which is easy to handle in maintenance and has a position detecting function is obtained. This valve is formed of a solenoid valve 1 and a manifold base 2 onto which the solenoid valve 1 is mounted. The solenoid valve 1 includes a magnet 20 mounted to a piston 12a to detect a position and a depression 22 in which a sensor is to be mounted and which is provided in a position corresponding to the magnet 20. The manifold base 2 includes a magnetometric sensor 21 provided to a position corresponding to the depression 22 in a projecting state and the magnetometric sensor 21 is automatically mounted in the depression 22 when the solenoid valve 1 is mounted onto the manifold base 2.

8 Claims, 6 Drawing Sheets

MANIFOLD VALVE HAVING POSITION DETECTING FUNCTION

TECHNICAL FIELD

The present invention relates to a manifold valve with a position detecting function for detecting an operating position of a solenoid valve placed on a manifold base by using a magnet and a magnetometric sensor.

PRIOR ART

There is a known solenoid vale in which an operating position of a spool can be detected by using a magnet and a magnetometric sensor as disclosed in Japanese Utility Model Application Laid-open No. 2-66784, for example. This solenoid valve is formed by mounting the magnet to an outer periphery of the spool and mounting the magnetometric sensor for sensing magnetism to a casing. When the spool moves to one switching position, the magnetometric sensor senses the magnet and is turned on. When the spool moves to the other switching position, the magnetometric sensor is separated from the magnet and turned off. The magnetometric sensor is connected to a controller by a lead which is led outside from the casing of the solenoid valve.

On the other hand, solenoid valves of this type includes one used as a manifold valve when it is placed on a manifold base. This manifold valve is normally formed by placing one or more solenoid valves on the manifold base such that pressure fluid and power are supplied together to the respective solenoid valves through the manifold base.

In such a manifold valve, similarly to the above-described known art, it is possible to detect the operating positions of the respective solenoid valves by using the magnet and the magnetometric sensor. In this case, however, it is necessary to route a conductor outside the casing and to introduce and connect the conductor into an electric connection portion of the manifold base if the magnetometric sensor is mounted to the casing of the solenoid valve like in the know art. As a result, problems such as burdensome and disorderly wiring and interference of the conductor with other members are likely to occur. Because the sensor connected by the conductor to the manifold base has to be detached from the casing or the conductor has to be cut off from the manifold base in order to separate the manifold base and the solenoid valve from each other in maintenance, handling is burdensome.

DISCLOSURE OF THE INVENTION

It is a technical object of the present invention to provide a manifold valve in which mounting of a magnetometric sensor is easy and wiring is easy and which is easy to handle in maintenance and has a position detecting function.

To achieve the above object, according to the invention, there is provided a manifold valve comprising a solenoid valve for controlling pressure fluid and a manifold base for supplying the pressure fluid and power to the solenoid valve.

The solenoid valve includes a casing having a mounting face for mounting the solenoid valve onto the manifold base, a valve member provided for sliding in the casing, solenoid-type driving means for driving the valve member, a magnet provided to move in synchronization with the valve member, and a depression in which a sensor is to be mounted and which is provided in a position of the mounting face of the casing corresponding to the magnet.

The manifold base includes a placing face on which the solenoid valve is placed, a first plug to be connected to a controller for controlling the solenoid valve, at least one magnetometric sensor disposed in a position on the placing face corresponding to the depression so as to project from the placing face toward the solenoid valve and fitted in the depression when the solenoid valve is placed on the placing face, and continuity means for making the magnetometric sensor and the first plug electrically continuous with each other.

In the manifold valve of the invention having the above structure, the magnetometric sensor is provided to the manifold base in the projecting state, the depression is formed in the casing of the solenoid valve, and the magnetometric sensor is mounted to the predetermined position in the depression by placing the solenoid valve on the manifold base. Therefore, mounting of the magnetometric sensor is easy and wiring is easy because the conductor does not need to be routed outside. Moreover, because it is unnecessary to detach the magnetometric sensor from the manifold base and to cut off the conductor from the manifold base in separating the manifold base and the solenoid valve from each other for maintenance, handling is easy.

According to a preferable structural mode of the invention, a projecting portion to be fitted in the depression is provided to the placing face of the manifold base and the projecting portion functions as positioning means in connecting the manifold base and the solenoid valve and as a holder for holding the magnetometric sensor projecting from the placing face by housing the magnetometric sensor in the projecting portion.

According to a concrete structural mode of the invention, the solenoid valve is a spool-type solenoid valve, the driving means is one or two solenoid-operated pilot valve(s), and the solenoid valve has on opposite sides of the valve member pistons respectively operated by operation of pilot fluid. The magnet is mounted to any of the valve member and the pistons.

In the invention, it is preferable that the magnet is mounted to be separated from the pressure fluid or the pilot fluid.

According to a concrete structural mode of the invention, each the piston has a pressure chamber formed on a side of one end face of the piston, a breathing chamber formed on a side of the other end face of the piston, and piston packing for separating both the chambers from each other and the magnet is mounted to a position of one of the pistons closer to the breathing chamber than to the piston packing in a state in which the magnet is prevented from coming in contact with the pilot fluid by the piston packing.

DETAILED DESCRIPTION OF THE INVENTION

Figure 1:
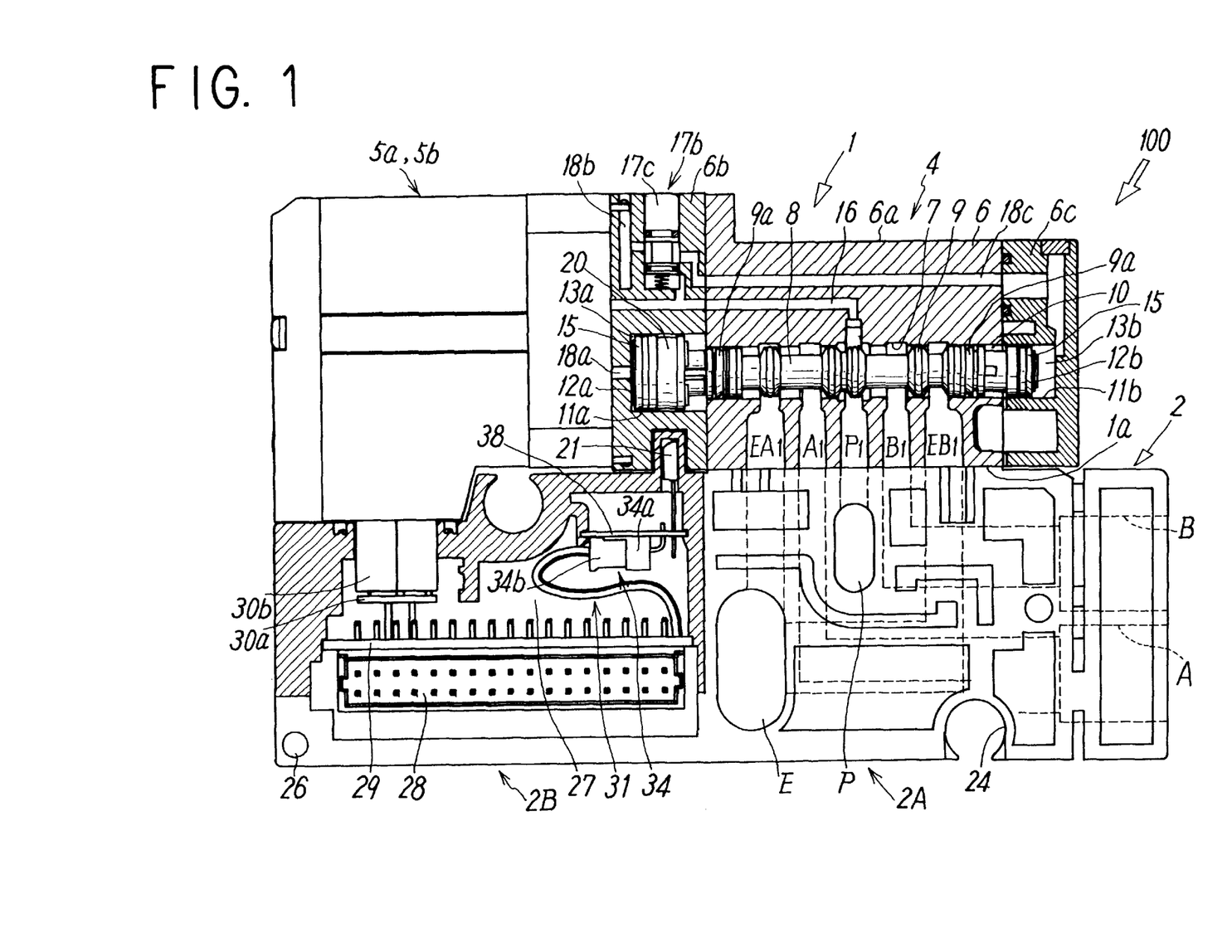
FIG. 1 is a sectional view of a first embodiment of a manifold valve according to the present invention.
Figure 2:
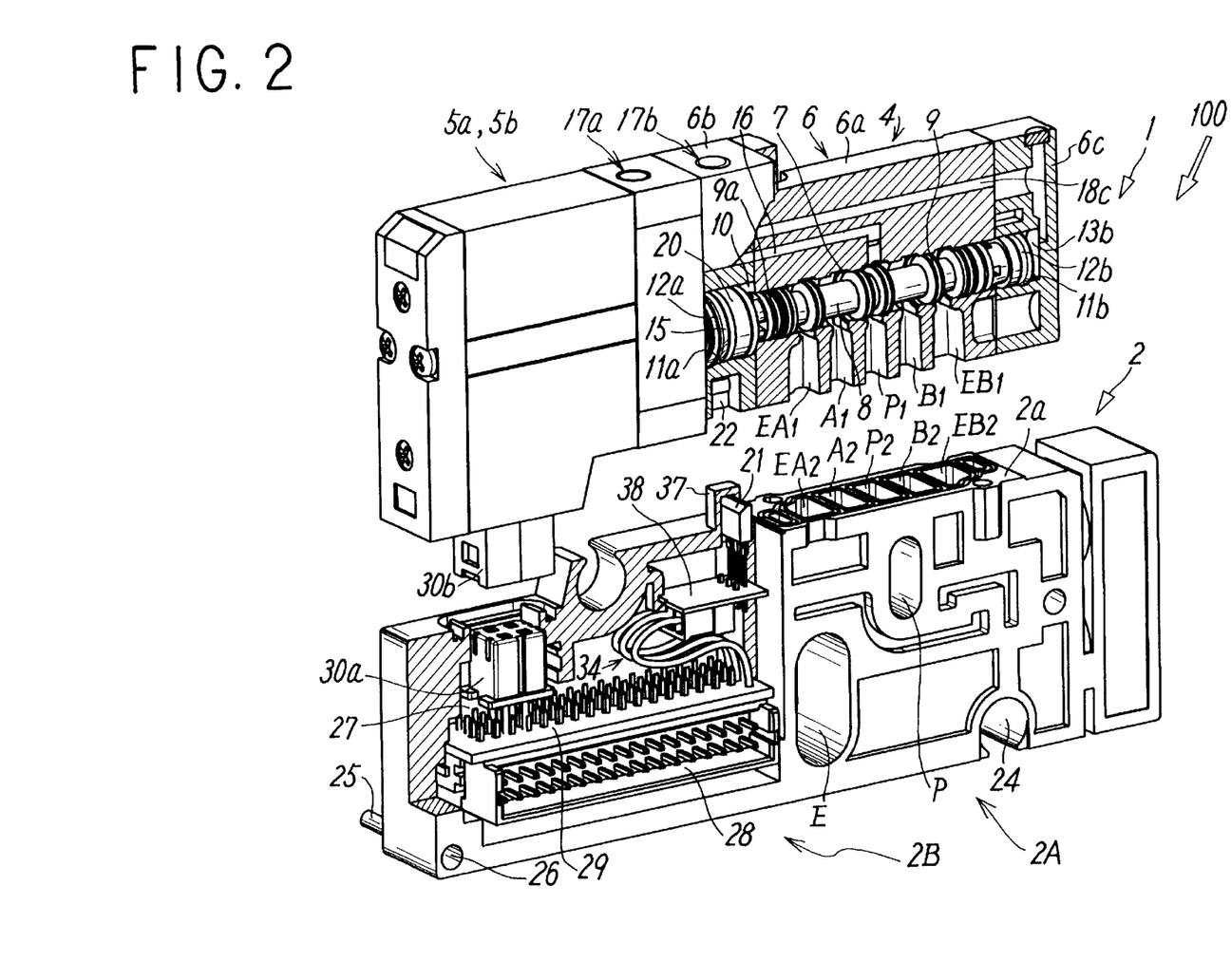
FIG. 2 is a perspective view showing a manifold valve in FIG. 1 in an exploded view and an essential portion in a cutaway view.
Figure 3:
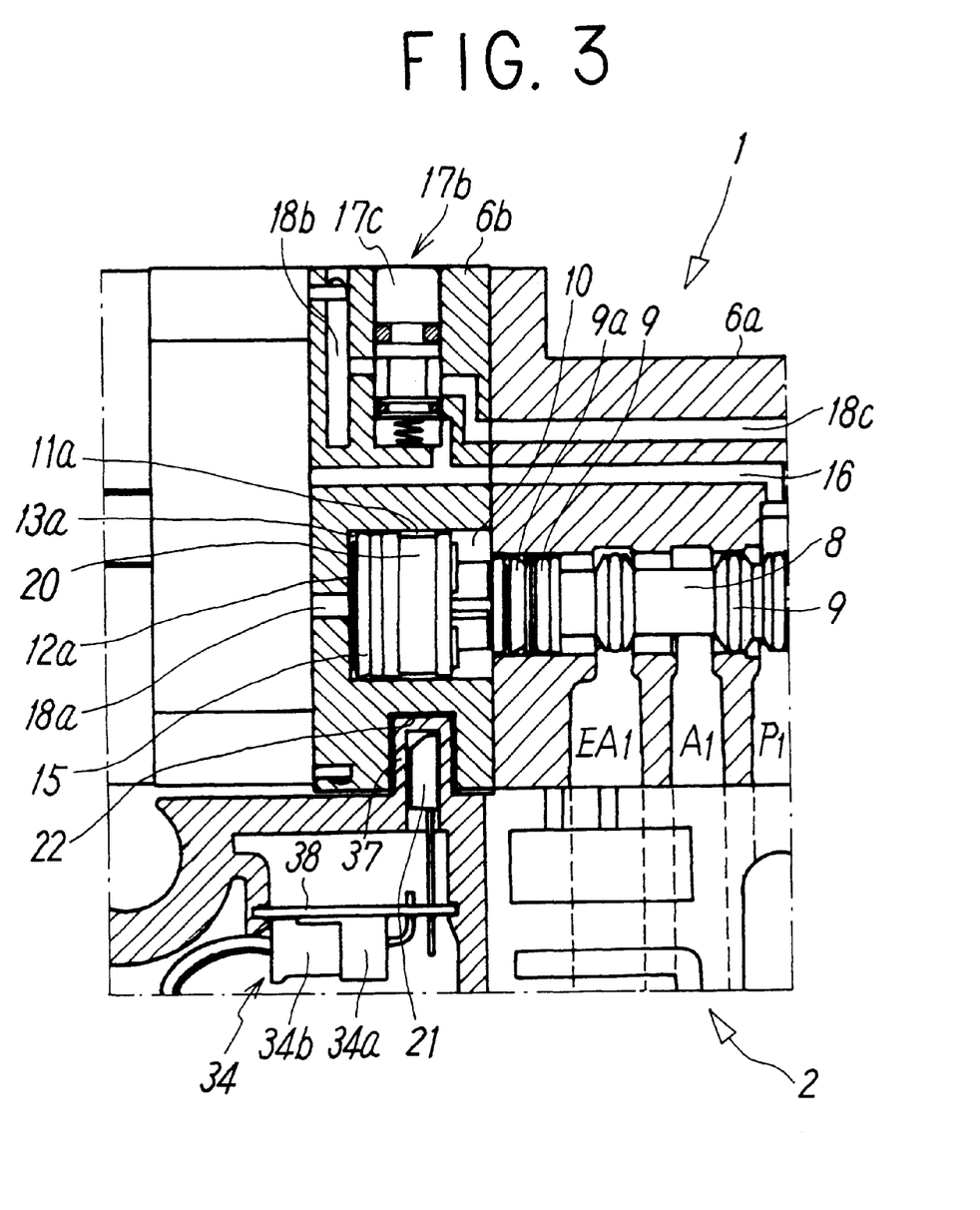
FIG. 3 is an enlarged view of an essential portion in FIG. 1.

FIGS. 1 to 3 show a first embodiment of a manifold valve according to the present invention. This manifold valve 100 has a solenoid valve 1 for controlling pressure fluid such as compressed air and a manifold base 2 for supplying the pressure fluid and power to the solenoid valve 1 and the solenoid valve 1 is mounted onto the manifold base 2.

The solenoid valve 1 is a double-pilot-type solenoid valve and includes a main valve 4 and two solenoid-operated pilot valves 5a and 5b mounted side by side to an end of the main valve 4 and the main valve 4 is switched by using these pilot valves 5a and 5b. The main valve 4 is formed as a five-port valve and has a casing 6 formed of non-magnetic material. The casing 6 is formed of a first member 6a having a rectangular section, a second member 6b connected to an end of the first member 6a and also functioning as an adaptor for mounting the pilot valves 5a and 5b, and a third member 6c connected to the other end of the first member 6a and functioning as an end cover for closing an end portion of the casing and a lower face of the casing 6 is formed as a substantially flat mounting face 1a so as to fix the casing 6 to a placing face 2a on an upper face of the manifold base 2.

To the mounting face 1a, in a position which is a bottom face of the first member 6a, a supply through hole P1, two output through holes $A_1$ and $B_1$ positioned on opposite sides of the supply through hole $P_1$, and two discharge through holes $EA_1$ and $EB_1$ positioned on opposite sides of the output through holes $A_1$ and $B_1$ are provided. Inside the first member 6a, a valve hole 7 into which the respective through holes open side by side in an axial direction is provided and a spool 8 which is a valve member for switching flow paths is housed for sliding in the valve hole 7.

A plurality of sealing members 9 for partitioning a flow path connecting respective ports are provided to an outer periphery of the spool 8 and an end portion sealing member 9a for separating a breathing chamber 10 which each the of an end portions of the spool 8 faces and the flow path of working fluid in the valve hole 7 from each other is provided to an outer periphery of each of opposite end portions of the spool 8.

On the other hand, in the second member 6b and the third member 6c, piston chambers 11a and 11b are formed respectively in positions which the opposite ends of the spool 8 face. The first piston chamber 11a formed in the second member 6b has a large diameter and a first piston 12a having a large diameter is housed for sliding in the first piston chamber 11a. The second piston chamber 11b formed in the third member 6c has a smaller diameter than the first piston chamber 11a and a second piston 12b having a small diameter is housed for sliding in the second piston chamber 11b. The pistons 12a and 12b are detachably in contact with end faces of the spool 8 or integrally connected to the spool 8 and move in synchronization with the spool 8.

First and second pressure chambers 13a and 13b are respectively formed on back face sides of the respective pistons 12a and 12b, i.e., in portions opposite to the faces in contact with the spool 8. The breathing chambers 10, 10 which respectively open outside through holes (not shown) are formed between the respective pistons 12a and 12b and the spool 8. These pressure chambers 13a, 13b and the breathing chambers 10, 10 are airtightly separated from each other by pieces of piston packing 15, 15 mounted to outer peripheries of the pistons 12a and 12b.

The first pressure chamber 13a positioned on a side of the first piston 12a having the large diameter communicates with a supply port P through a pilot supply flow path 16, a manual operation mechanism 17a (see FIG. 2) provided to an auxiliary block 14, the one pilot valve 5a, and a pilot output flow path 18a as can be seen from FIG. 3. The second pressure chamber 13b positioned on a side of the second piston 12b having the small diameter communicates with the supply port P through the pilot supply flow path 16, the other pilot valve 5b, a pilot output flow path 18b, a manual operation mechanism 17b, and a pilot output flow path 18c.

When the one pilot valve 5a is turned off, the first pressure chamber 13a opens into the atmosphere, the other pilot valve 5b is turned on, and pilot fluid from the pilot supply flow path 16 is supplied to the second pressure chamber 13b through the pilot output flow paths 18b and 18c, the spool 8 is pushed by the second piston 12b to occupy a first switching position which is displaced leftward as shown in FIG. 1. If switching between the pilot valves 5a and 5b is carried out from this state such that the pilot valve 5a is turned on and that the pilot valve 5b is turned off, the second pressure chamber 13b opens into the atmosphere and the pilot fluid is supplied to the first pressure chamber 13a. Therefore, the spool 8 is pushed by the piston 12a, moved rightward, and switched to a second switching position.

The manual operation mechanisms 17a and 17b are respectively for manually obtaining switching states similar to the cases in which the pilot valves 5a and 5b are turned on and used during a power failure or when the pilot valves are out of order. In other words, the manual operation mechanism 17a corresponds to the pilot valve 5a. By pushing down an operation member 17c, the pilot supply flow path 16 and the pilot output flow path 18a directly communicate with each other and pilot fluid is supplied to the first pressure chamber 13a from the supply port P. The other manual operation mechanism 17b corresponds to the pilot valve 5b. By pushing down an operation member 17c, the pilot supply flow path 16 and the pilot output flow path 18c directly communicate with each other and the pilot fluid is supplied to the second pressure chamber 13b from the supply port P.

The pilot valves 5a and 5b are the solenoid-operated pilot valves for opening and closing the pilot flow paths by energization of a solenoid. Because structures and operations of the pilot valves 5a and 5b are similar to those of known pilot valves, concrete descriptions of them will be omitted.

To the first piston 12a of the solenoid valve 1, a magnet 20 as a detected body in detecting an operating position of the spool 8 is mounted. This magnet 20 is formed by mixing metal powder having a magnetic property into a soft elastic base material such as synthetic resin and synthetic rubber in a ring shape having a notch at a portion of a circumference. The magnet 20 is mounted by fitting the magnet in a mounting groove formed in a position of an outer periphery of the piston 12a closer to the breathing chamber 10 than to the piston packing 15 while elastically expanding a diameter of the magnet 20. By detecting the magnet 20 moving with the first piston 12a (and therefore, the spool 8) with a magnetometric sensor 21 mounted to the manifold base 2, the operating position of the spool 8 can be detected.

In this case, it is preferable that the magnet 20 is formed to have a thickness slightly smaller than a depth of the mounting groove such that an outer peripheral face of the magnet 20 is in a lower position than the outer peripheral face of the piston 12a and does not come in sliding contact with an inner peripheral face of the piston chamber 11b. As a result, not only increase of sliding resistance of the piston 12a due to sliding contact of the magnet 20 with the piston 12a but also an adverse effect of adsorption of minute magnetic particles in the atmosphere by the magnet 20 on sliding of the piston 12a can be prevented even if the magnet 20 adsorbs a small amount of minute magnetic particles in the atmosphere.

By providing the magnet 20 in the position of the outer periphery of the piston 12a on the breathing chamber 10 side as described above, it is possible to prevent the magnet 20 from coming in direct contact with the pilot fluid and the pressure fluid in the main valve 4. Therefore, if moisture, chemical mist, particles of magnetic material such as metal powder, and the like are included in the fluid, the magnet 20 does not rust or corrode in contact with the moisture and chemical mist and does not adsorb the particles of magnetic material. As a result, reduction of accuracy of position detection due to reduction of magnetic force and an inoperable state of the piston 12a due to the adsorbed minute particles do not occur.

In the mounting face 1a provided to the casing 6 of the solenoid valve 1, a depression 22 having a substantially rectangular sectional shape in which the magnetometric sensor 21 is fitted is formed in a position which is a bottom face of the second member 6d to have such a depth as to be close to the first piston 12a.

The manifold base 2 onto which the solenoid valve 1 is mounted is of a stacking type used by welding a plurality of manifold bases together in a thickness direction and is formed of non-magnetic material. The manifold base 2 has a flow path forming portion 2A formed on a side of a half of the manifold base 2 and an electric connection portion 2B formed on a side of the other half. On an upper face of the manifold base 2, a placing face 2a is formed astride the flow path forming portion 2A and the electric connection portion 2B. The flow path forming portion 2A and the electric connection portion 2B may be formed integrally or may be formed separately and connected to each other.

In the flow path forming portion 2A, the supply flow path P and a discharge flow path E passing through the manifold base 2 in the thickness direction are formed and two output ports A and B which open in an end face of the manifold base 2 are formed. The supply flow path P and the discharge flow path E and the respective output ports A and B respectively communicate with a supply through hole $P_2$, two discharge through holes $EA_2$ and $EB_2$, and two output through holes $A_2$ and $B_2$ through connecting holes formed in the flow path forming portion 2A opening in the mounting face 2a of the solenoid valve. When the solenoid valve is mounted onto the placing face 2a, these respective through holes respectively communicate with the supply through hole $P_1$, the two discharge through holes $EA_1$ and $EB_1$, and the two output through holes $A_1$ and $B_1$ opening in the mounting face 1a of the solenoid valve.

In the drawing, a reference numeral 24 designates a fastening hole through which a bolt is inserted in joining and fastening the plurality of manifold bases 2 to each other and reference numerals 25 and 26 designate positioning projection and fitting hole provided to positions facing each other on opposite faces of the manifold base and the projection 25 is fitted in the fitting hole 26 of an adjacent manifold base 2.

The electric connection portion 2B includes a housing chamber 27 in which various electrical components for connection are housed. In this housing chamber 27, a first plug 28 to which a first socket (not shown) at a tip end of a conductor led from a controller for controlling the solenoid valve is connected, a first printed circuit board 29 electrically connected to the first plug 28, a second socket 30a connected to the first printed circuit board 29, and continuity means 31 for making the magnetometric sensor 21 and the first printed circuit board 29 electrically continuous with each other are provided.

The second socket 30a is detachably connected to a second plug 30b mounted to the pilot valves 5a and 5b of the solenoid valve 1. On the other hand, the continuity means 31 is formed of a second printed circuit board 38 to which the magnetometric sensor 21 is mounted and a connector 34 for detachably connecting the second printed circuit board 38 and the first printed circuit board 29. The connector 34 is formed of a third socket 34a mounted to the second printed circuit board 38 and a third plug 34b mounted to a conductor 35 extending from the first printed circuit board 29 and detachably connected to the third socket 34a.

A cap-shaped projecting portion 37 having a rectangular section in such a size as to substantially fit in the depression 22 of the solenoid valve 1 is formed on an upper face of the electric connection portion 2B to project upward from a placing face 2a. The magnetometric sensor 21 is inserted into the projecting portion 37 from a side of the housing chamber 27 and the magnetometric sensor 21 is held by the projecting portion 37 to project from the placing face 2a toward the solenoid valve 1. By mounting the solenoid valve 1 onto the placing face 2a of the manifold base 2, the projecting portion 37 is fitted in the depression 22 to position the manifold base 2 and the solenoid valve 1 with respect to each other and the magnetometric sensor 21 is mounted in a fitted state in the depression 22 through the projecting portion 37. Therefore, the projecting portion 37 functions as positioning means used in connecting the manifold base 2 and the solenoid valve 1 and as a holder for holding the magnetometric sensor 21 projecting from the placing face. Although the projecting portion 37 is formed integrally with the manifold base 2, the projecting portion 37 may be formed separately and fixed to the manifold base 2.

The magnet 20 and the magnetometric sensor 21 may be disposed in such positions with respect to each other that the magnetometric sensor 21 detects magnetism of the magnet 20 when the piston 12a (therefore, the spool 8) is at one stroke end to thereby detect the position of the spool 8 at the one stroke end or the magnet 20 and the magnetometric sensor 21 may be disposed in such positions with respect to each other that the magnetometric sensor 21 can detect magnetism of the magnet 20 throughout the stroke of the spool 8 in an analog fashion to thereby detect an arbitrary position of the spool 8 throughout the stroke.

In the manifold valve 100 having the above structure, because the magnetometric sensor 21 can be automatically mounted to a predetermined position in the depression 22 by only mounting the solenoid valve 1 onto the manifold base 2, mounting of the magnetometric sensor 21 is easy. Because the conductor from the magnetometric sensor 21 does not need to be routed outside, wiring is easy. Furthermore, because it is unnecessary to detach the magnetometric sensor 21 from the manifold base 2 and to cut off the conductor from the manifold base 2 in separating the manifold base 2 and the solenoid valve 1 from each other for maintenance, handling is easy.

Figure 4:
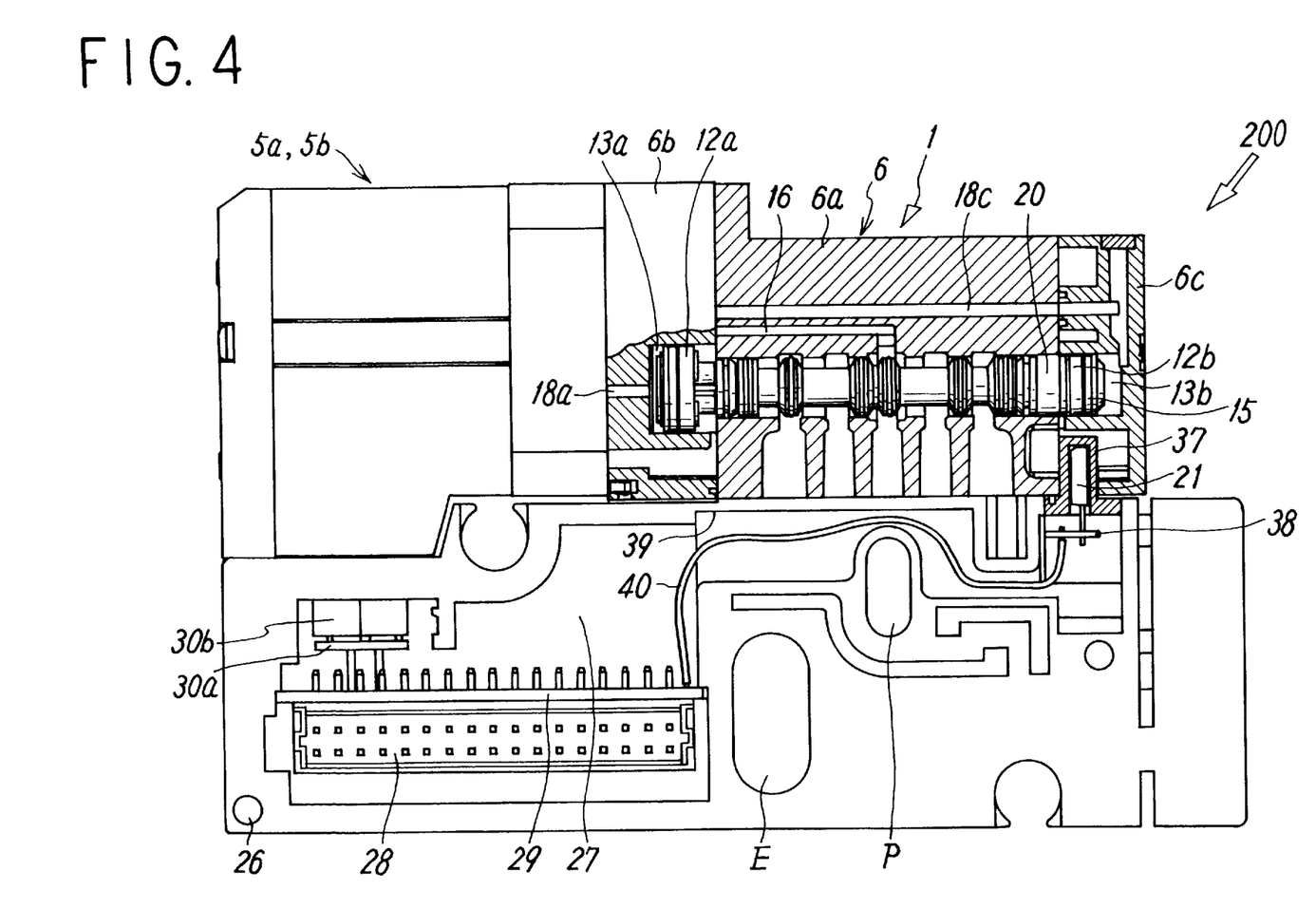
FIG. 4 is a sectional view of a second embodiment of the manifold valve according to the invention.
Figure 5:
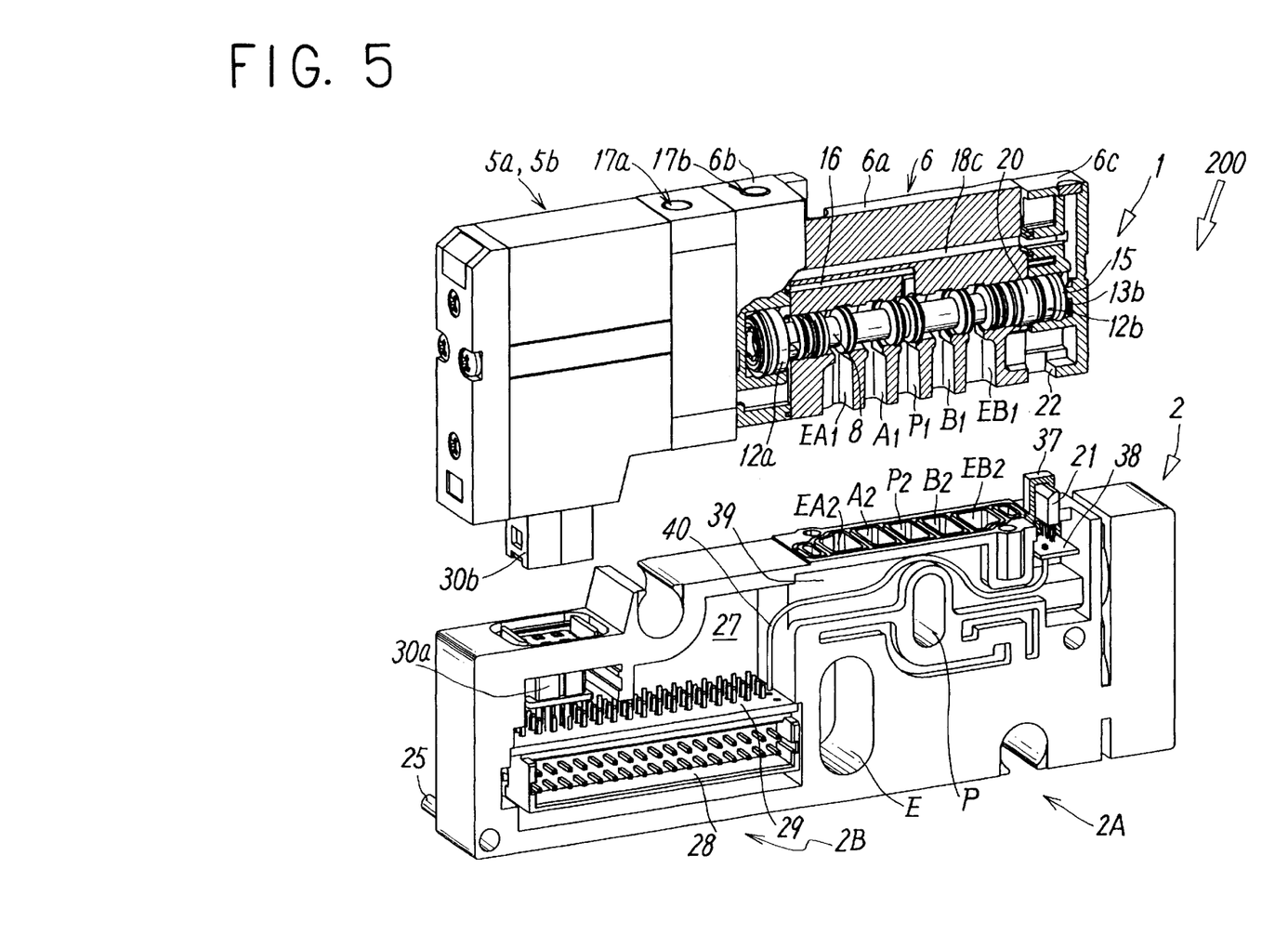
FIG. 5 is a perspective view showing a manifold valve in FIG. 4 in an exploded view and an essential portion in a cutaway view.

FIGS. 4 and 5 show a second embodiment of the manifold valve according to the invention. The manifold valve 200 of the second embodiment is different from the manifold valve 100 of the first embodiment in that the magnet 20 is mounted to the second piston 12b having the small diameter on the opposite side to the first piston 12a and that the magnetometric sensor 21 is mounted to a position of the manifold base 2 on a side of the second piston 12b in the second embodiment while the magnet 20 is mounted to the first piston 12a having the large diameter and the magnetometric sensor 21 is mounted to the position of the manifold base 2 corresponding to the first piston 12a in the first embodiment.

In other words, the depression 22 is formed in the lower face of the third member 6c of the casing 6 of the solenoid valve 1, the projecting portion 37 is formed on the upper face of the flow path forming portion 2A in the manifold base 2, and the magnetometric sensor 21 is retained in the projecting portion 37. An insertion groove 39 for wiring is formed in a side face of the flow path forming portion 2A in the manifold base 2 and the second printed circuit board 38 to which the magnetometric sensor 21 is connected and the first printed circuit board 29 are directly connected to each other by a conductor 40 inserted through the insertion groove 39.

Because structures of the second embodiment other than those described above are substantially similar to those of the first embodiment, the main similar components are provided with similar reference numerals to the first embodiment to omit description of the components.

Figure 6:
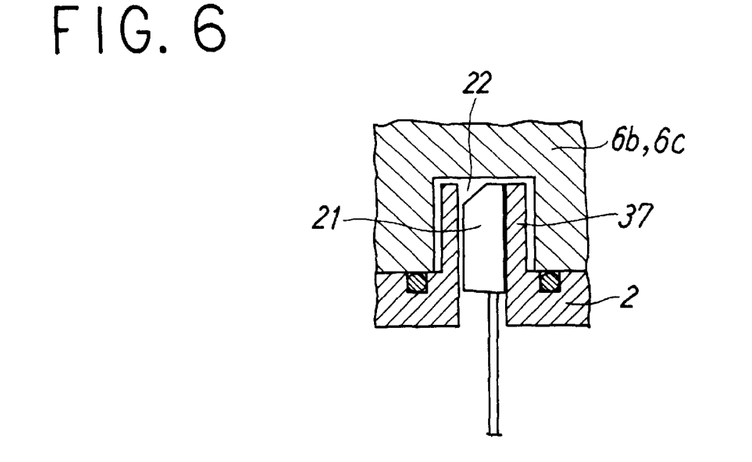
FIG. 6 is a sectional view of an essential portion showing another example of a mounting method of a magnetometric sensor.
Figure 7:
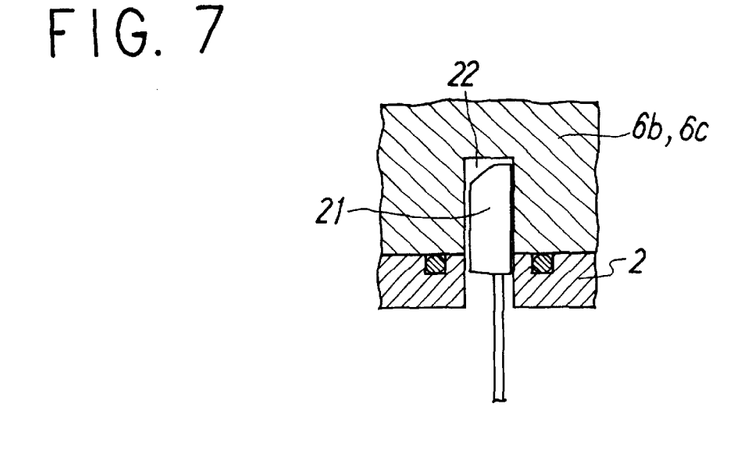
FIG. 7 is a sectional view of an essential portion showing yet another example of the mounting method of the magnetometric sensor.

Although the hollow cap-shaped projecting portion 37 is formed in the manifold base 2 and the magnetometric sensor 21 is housed in the projecting portion 37 to thereby retain the magnetometric sensor 21 projecting from the manifold base 2 in the above respective embodiments, a mounting method of the magnetometric sensor 21 is not limited to this method. In a method shown in FIG. 6, the projecting portion 37 is formed into a shape of a hollow tube with an open tip end and the magnetometric sensor 21 is housed in the projecting portion 37. In this case, the magnetometric sensor 21 may be housed so as not to project outside from the projecting portion 37 or may be housed with a portion of the magnetometric sensor 21 projecting from the projecting portion 37. In a method shown in FIG. 7, the magnetometric sensor 21 is mounted while being exposed outside without providing the above projecting portion 37 to the manifold base 2.

Figure 8:
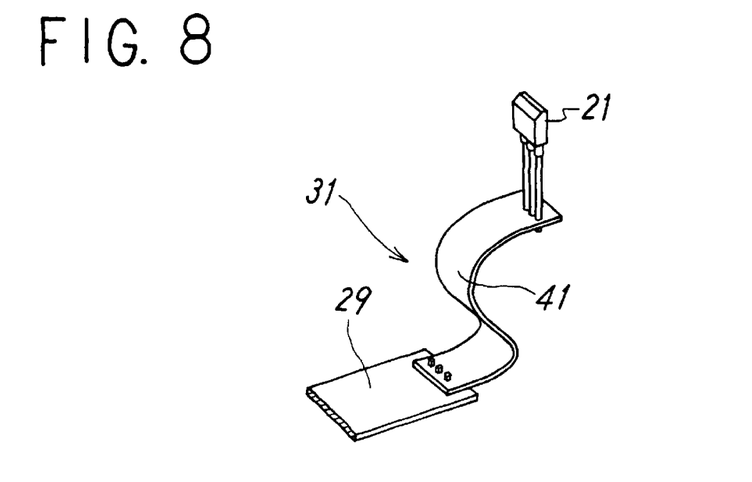
FIG. 8 is a perspective view of an essential portion showing another example of a connecting method of the magnetometric sensor.

Furthermore, FIG. 8 shows a different example of the continuity means 31 for connecting the magnetometric sensor 21 and the first printed circuit board 29. In this example, the magnetometric sensor 21 and the first printed circuit board 29 are directly connected by a flexible conductor 41, though the second printed circuit board 38 and the first printed circuit board 29 are detachably connected by the third connector 34 in the above embodiments.

Although the magnet 20 is mounted to the piston in the above embodiments, the magnet 20 may be mounted to the spool 8. In this case, the magnet 20 is preferably mounted to a position of an end portion of the spool 8 closer to the breathing chamber 10 than to the end portion sealing member 9a so as to prevent the magnet 20 from coming in contact with the pressure fluid.

Although the one magnetometric sensor 21 is mounted in the depression 22 in the above respective embodiments, two or more magnetometric sensors may be mounted. By mounting a plurality of magnetometric sensors, it is possible to easily detect positions of the spool 8 at opposite stroke ends and the arbitrary position of the spool 8 in the stroke.

Although the two pistons have large and small different diameters in the solenoid valve of the above respective embodiments, it is also possible to use the pistons with the same diameters.

It is also possible to use a single-pilot-type solenoid valve in which the spool is switched by using one pilot valve as the solenoid valve.

Needless to say, the invention can also be applied to a manifold valve having a solenoid valve which is not of the spool type, e.g., a manifold valve having a poppet-type solenoid valve.

As described above in detail, according to the invention, it is possible to obtain the manifold valve in which mounting of the magnetometric sensor is easy and wiring is easy and which is easy to handle in maintenance and has the position detecting function.

What is claimed is:

1. A manifold valve having a position detecting function and comprising a solenoid valve for controlling pressure fluid and a manifold base for supplying said pressure fluid and power to said solenoid valve,
   wherein said solenoid valve includes a casing having a mounting face for mounting said solenoid valve onto said manifold base, a valve member for controlling fluid and provided in said casing, solenoid-type driving means for driving said valve member, a magnet for detecting a position and provided to move in synchronization with said valve member, and a depression in which a sensor is to be mounted and which is provided to said mounting face of said casing so as to correspond to said magnet and
   said manifold base includes a placing face on which said solenoid valve is placed, a first plug to be connected to a controller for controlling said solenoid valve, at least one magnetometric sensor disposed in a position on said placing face corresponding to said depression so as to project from said placing face toward said solenoid valve and fitted in said depression when said solenoid valve is placed on said placing face, and continuity means for making said magnetometric sensor and said first plug electrically continuous with each other.

2. A manifold valve according to claim 1, wherein a hollow projecting portion to be fitted in said depression is provided to said placing face on said manifold base and said projecting portion functions as positioning means in connecting said manifold base and said solenoid valve and as a holder for holding said magnetometric sensor projecting from said placing face by housing said magnetometric sensor in said projecting portion.

3. A manifold valve according to claim 2, wherein said solenoid valve is a spool-type solenoid valve, said driving means is one or two solenoid-operated pilot valve(s), said solenoid valve has on opposite sides of said valve member pistons respectively operated by operation of pilot fluid, and said magnet is mounted to any of said valve member and said pistons.

4. A manifold valve according to claim 3, wherein said magnet is mounted to be separated from said pressure fluid or said pilot fluid.

5. A manifold valve according to claim 3, wherein each said piston has a pressure chamber formed on a side of one end face of said piston, a breathing chamber formed on a side of the other end face of said piston, and piston packing for separating both said chambers from each other and said magnet is mounted to a position of one of said pistons closer to said breathing chamber than to said piston packing such that said magnet is prevented from coming in contact with said pilot fluid by said piston packing.

6. A manifold valve according to claim 1, wherein said solenoid valve is a spool-type solenoid valve, said driving means is one or two solenoid-operated pilot valve(s), said solenoid valve has on opposite sides of said valve member pistons respectively operated by operation of pilot fluid, and said magnet is mounted to any of said valve member and said pistons.

7. A manifold valve according to claim 6, wherein said magnet is mounted to be separated from said pressure fluid or said pilot fluid.

8. A manifold valve according to claim 6, wherein each said piston has a pressure chamber formed on a side of one end face of said piston, a breathing chamber formed on a side of the other end face of said piston, and piston packing for separating both said chambers from each other and said magnet is mounted to a position of one of said pistons closer to said breathing chamber than to said piston packing such that said magnet is prevented from coming in contact with said pilot fluid by said piston packing.

* * * * *